United States Patent
Manning et al.

(10) Patent No.: US 6,792,981 B1
(45) Date of Patent: Sep. 21, 2004

(54) METHOD AND APPARATUS FOR FILLING A PRESSURE VESSEL HAVING APPLICATION TO VEHICLE FUELING

(75) Inventors: Michael S. Manning, Buffalo, NY (US); James Smolarek, Boston, NY (US); Robert B. Bollinger, Getzville, NY (US); Ahmed Abdelwahab, Tonawanda, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 10/409,130

(22) Filed: Apr. 9, 2003

(51) Int. Cl.[7] .............................................. B65B 31/00
(52) U.S. Cl. ................................ 141/3; 141/4; 141/18; 141/47; 141/94
(58) Field of Search ...................... 141/2–4, 18, 47–49, 141/71, 94, 95, 98

(56) References Cited

U.S. PATENT DOCUMENTS

| | | | |
|---|---|---|---|
| 4,646,940 A | 3/1987 | Kramer et al. ................. 222/1 |
| 5,351,726 A | 10/1994 | Diggins .......................... 141/4 |
| 5,385,176 A | * 1/1995 | Price .............................. 141/1 |
| 5,538,051 A | 7/1996 | Brown et al. ................. 141/18 |
| 6,672,340 B2 | * 1/2004 | Mutter ........................... 141/4 |

* cited by examiner

Primary Examiner—Gregory L. Huson
Assistant Examiner—Peter deVore
(74) Attorney, Agent, or Firm—David M. Rosenblum

(57) ABSTRACT

A method and apparatus for introducing a compressed gas into a pressure vessel, for instance, hydrogen into a vehicle fuel tank, in which hydrogen is compressed in an initial and final compressions stages which can be powered by a common source. The initial compression stage can continually operate to compress the gas in a lower pressure storage bank during the time that hydrogen is dispensed to a vehicle fuel tank. In time periods between dispensing, the gas from the lower pressure stage and from the lower pressure storage bank is compressed in the final compression stage and stored in a higher pressure storage bank. When the pressure vessel is to be filled, the compressor compresses the gas from the higher pressure storage bank to fill the vessel.

17 Claims, 1 Drawing Sheet

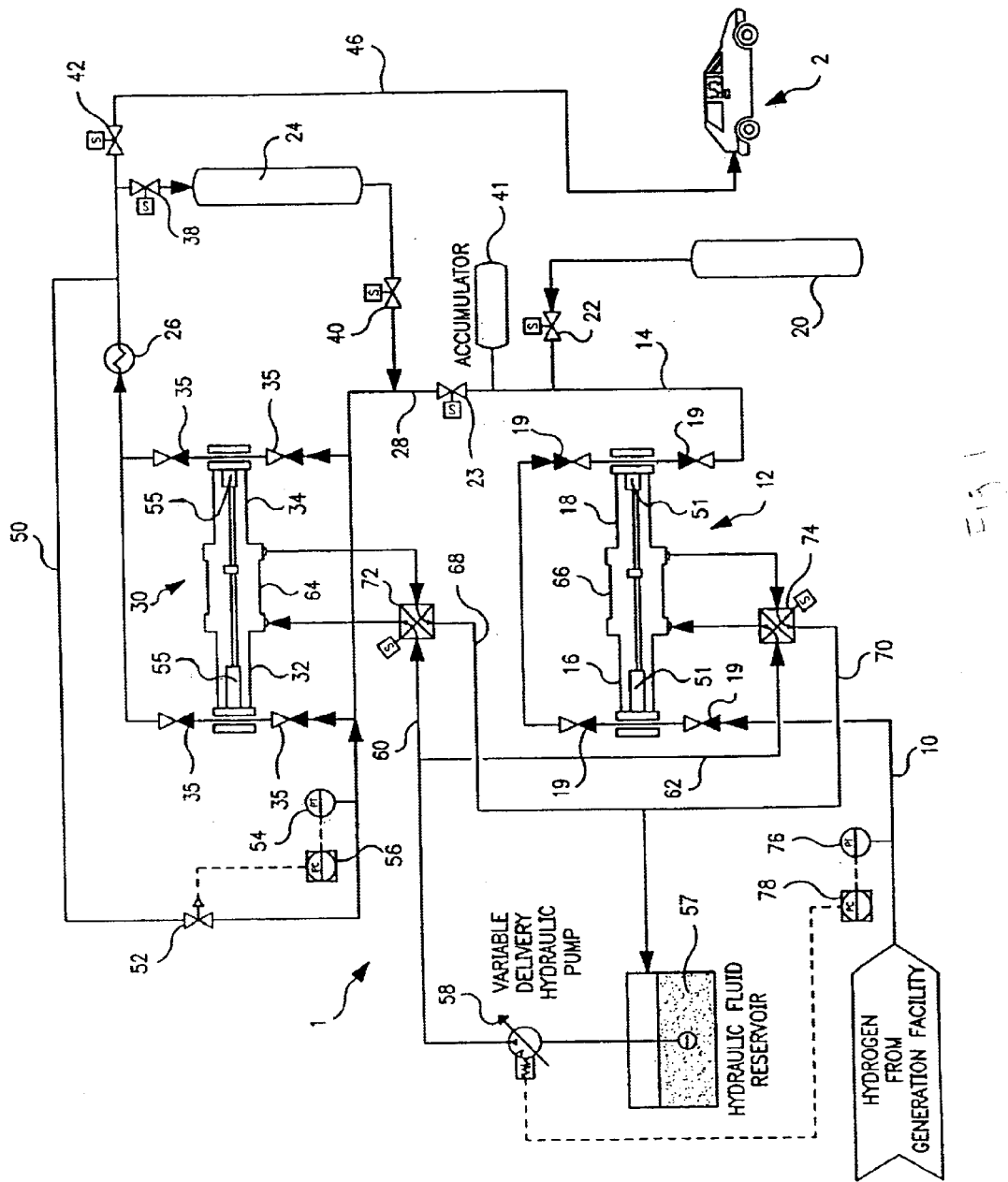

US 6,792,981 B1

METHOD AND APPARATUS FOR FILLING A PRESSURE VESSEL HAVING APPLICATION TO VEHICLE FUELING

FIELD OF THE INVENTION

The present invention relates to a method and apparatus for introducing a compressed gas into a pressure vessel in which a gas is compressed in initial and final compression stages which can be powered by a common source. More particularly, the present invention relates to such a method and apparatus in which the compressed gas is produced by compressing a higher pressure gas stored in a higher pressure storage bank which is charged in part by compressing a lower pressure gas in the final compression stage. Even more particularly, the present invention relates to such a method and apparatus in which the gas is hydrogen and the pressure vessel is a vehicle fuel tank.

BACKGROUND OF THE INVENTION

There exists a variety of industrial requirements for introducing compressed gases into pressure vessels, for instance, industrial gases and fuels such as compressed natural gas and hydrogen. With respect to hydrogen, there has been an increased interest in utilizing hydrogen as a fuel for internal combustion engines and fuel cells such as found in automobiles and buses. In order to store sufficient amounts of hydrogen to make the utilization of hydrogen practical for such purposes, the hydrogen must be stored in the vehicle fuel tank at high pressure, typically in excess of 5000 psig.

One important aspect in making the use of hydrogen practical is to provide equipment to conduct a filling operation that closely matches consumer expectations with respect to conventional fossil fuel filling. This expectation involves filling vehicle fuel tanks with hydrogen in between about 3 and about 5 minutes. Such rapid hydrogen filling can be accomplished with the use of high pressure cascaded storage tanks that sequentially dispense the hydrogen at high pressure. In cascade filling, when a consumer arrives at the filling station and connects a transfer hose to his or her vehicle, the fuel tank is connected to one of the cascaded storage tanks. Hydrogen flows out of the storage tank until pressure between the vehicle storage tank and the hydrogen storage tank equalizes. Hydrogen is then dispensed from another storage tank in the cascade to complete the filling of the tank. When one tank is dispensing, another tank can be filled or topped off with hydrogen.

The problem with cascade dispensing, as described above, is that the compressor that is used in connection with the filling of the cascaded tanks cannot be efficiently designed in that it has to be sized to compress the hydrogen from a low pressure to a high pressure to completely fill a tank and also to compress hydrogen from a medium pressure to a high pressure after a tank has undergone pressure equalization with a vehicle fuel tank. Hence, the compressor is oversized with respect to operations in a range from medium pressure to high pressure. Moreover, if the hydrogen is to be made on site, by for instance electrolysis, there are periods of time in which such equipment is not efficiently utilized in that the equipment must be turned down or off between filling periods.

Another large disadvantage with cascade dispensing is that direct tank to tank pressure transfer results in a lower pressure level in the vehicle as compared to the highest pressure storage bank. Assuming the banks are not re-pressurized between vehicle fills, any subsequent vehicle final pressure will be lower than the previous vehicle. This pressure decrease can be minimized by with the use of large storage volumes (higher capital and larger footprint penalty). As an option, the product compressor can be used to top off the vehicle tanks once the pressure transfers from the cascade banks are completed, however, this top off fill could take a considerable amount of time relative to consumer "fast fill" expectations.

The problem of dispensing fuels at high pressure has been encountered in connection with compressed natural gases. For instance in U.S. Pat. No. 5,351,726, a compressed natural gas refueling system is disclosed in which a single stage hydraulic compressor is provided to operate at suction pressures ranging from about 330 psig up to about 3600 psig and at discharge pressure ranging from 330 psig to 4500 psig. Compressed natural gas is supplied to an intermediate pressure storage tank at an intermediate pressure that is above the inlet source pressure for the natural gas. When vehicles are to be refueled, the vehicle is first refueled directly from the intermediate pressure storage tank. After equalization of pressure, the compressor compresses gas from the intermediate storage tank to the vehicle fuel tank to complete the refueling operation. Since the compressor does not have to function to compress natural gas from the supply pressure to the vehicle fill pressure at one time, the compressor itself can be a more compact energy efficient unit than a compressor size that would otherwise be required for such application.

In hydrogen filling applications, the hydrogen fill pressures are higher than those of the prior art involved in compressed natural gas. In addition, as with any vehicle filling station, footprint size becomes paramount. In addition, while there exists many sources of natural gas, hydrogen must be delivered and stored on site or at least made on site. In order to efficiently utilize systems that involve the manufacture of hydrogen on site, it is more efficient to allow for a continual utilization of the generation facilities. For instance, a facility that is designed to supply hydrogen on demand must be sized larger than a facility that continually supplies a nominal amount of hydrogen.

As will be discussed, the present invention provides a method of filling a vehicle fuel tank with hydrogen in which hydrogen sources can be continually used and that allows compact compression systems to be fabricated that are capable of compressing the hydrogen to the high vehicle fill pressures.

SUMMARY OF THE INVENTION

The present invention provides a method of introducing a compressed gas into a pressure vessel. In accordance with the method, a feed stream of a gas is compressed in an initial compression stage to form a lower pressure gas stream. During introduction of the compressed gas into the pressure vessel, a lower pressure storage bank is charged with the lower pressure gas stream, thereby to store lower pressure gas. Additionally, a compressed gas stream and therefore, the compressed gas, is introduced into a pressure vessel. The compressed gas stream is formed by compressing a stream of higher pressure gas in a final compression stage. The higher pressure gas is stored in a higher pressure storage bank.

During periods between the introduction of the compressed gas into the pressure vessel, the higher pressure storage bank can be charged with the compressed gas stream. The compressed gas is formed by compressing a combined stream in the final compression stage. The combined gas stream is composed of the lower pressure gas stream and a stream of stored lower pressure gas from the lower pressure storage bank.

The present invention advantageously allows the feed stream to be continually compressed and therefore continuously utilized. As will be discussed, the present invention has particular application to hydrogen fueling operations. As can be appreciated, since the source of hydrogen, for instance, an electrolysis unit or a steam methane reformer, can be made to continually produce said feed stream to be compressed, the source itself can be more fully utilized than prior art systems in which hydrogen is produced, stored and then dispensed. This allows the hydrogen source to be operated at a lower energy input, for instance, electricity in the case of electrolysis unit, or the source unit to be of a lessor scale than otherwise would have been required had the source unit been designed for intermittent operation. It is to be noted that the present invention also contemplates discontinuous operation.

The charging of a higher pressure storage bank can further comprise initially compressing the combined gas stream in the final compression stage and then completing the charging of the higher pressure storage bank by compressing a further combined stream in the final compression stage. The final combined stream can be composed of the lower pressure gas stream and part of the compressed gas stream. The remaining part of the compressed gas stream is then introduced in the higher pressure storage bank.

Alternatively, the higher pressure storage bank can be charged by again initially compressing the combined gas stream in the final compression stage and then completing the charging of the higher pressure storage bank by solely compressing the lower pressure gas stream within the final compression stage. In such embodiment, the final compression stage is a variable speed compressor and the speed of such variable speed compressor is reduced when the higher pressure storage bank is charged solely by compressing the lower pressure gas stream.

Since, during charging of the higher pressure storage bank, the lower pressure storage bank will become depleted, the available pressure of the gas stored within such storage bank will also be reduced. This will in turn reduce pressure at the suction side of the compressor. In order to maintain the suction pressure constant, either recycle or variable speed can be used as described above.

In another aspect, the initial and final compression stages can be provided with moving compression elements in which motion is imparted to the moving compression elements from a common source. In this regard the initial and final compression stages can be formed by first and second hydraulically powered reciprocating compressors, respectively. The feed stream is compressed in first and second cylinders of the first hydraulically powered reciprocating compressor. The first and second cylinders are operated at successively higher pressures. The combined stream in the stream of higher pressure gas are each alternately compressed in third and fourth cylinders of the second hydraulically powered reciprocating compressor. Hydraulic fluid is pumped by a common pump and used to impart motion to the moving compression elements formed by pistons within the first, second, third and fourth cylinders.

As discussed above, the pressure vessel can be a vehicle fuel tank and the gas can be hydrogen. In such case, the feed stream is at a source pressure of between about 70 psig and about 200 psig. The lower pressure storage bank is charged to a lower pressure between about 850 psig and about 1500 psig. The higher pressure storage bank is charged to a higher pressure of between about 850 psig and about 7000 psig.

It is to be noted that by imparting motion to moving compression elements from a common source, preferably hydraulically, the first and second compression stages can be mounted on a common skid to thereby decrease the footprint of the apparatus. In this regard, in another aspect of the present invention a method is provided for introducing a compressed gas into a pressure vessel. In accordance with such method, during periods between the introduction of a compressed gas into the pressure vessel, a feed stream is compressed in an initial compression stage to form a lower pressure gas stream. The lower pressure gas stream is compressed in a final compression stage to form a compressed gas stream. A storage bank is charged with the compressed gas stream to store higher pressure gas. During the introduction of the compressed gas into the pressure vessel, a compressed gas stream is introduced into the pressure vessel and the compressed gas stream is formed by compressing a stream of the higher pressure gas in the final compression stage. Motion is imparted to moving compression elements contained within the initial and final compression stages that act to compress the feed stream, the lower pressure gas stream and the stream of higher pressure gas, all from a common source.

Again, the initial and final compression stages can be formed by first and second hydraulically powered reciprocating compressors, respectively. The feed stream is compressed in first and second cylinders of the first hydraulically powered reciprocating compressor. The first and second cylinders are operated at successively higher pressures. The lower pressure gas stream and the stream of the higher pressure gas are each alternately compressed in third and fourth cylinders of the second hydraulically powered reciprocating compressor. Hydraulic fluid is pumped from a common pump to impart motion of the moving compression elements formed by pistons within the first, second, third and fourth cylinders. Again, the pressure vessel can be a vehicle fuel tank and the gas to be compressed can be hydrogen.

In another aspect of the present invention, an apparatus is provided for introducing a compressed gas into a pressure vessel. An initial compression stage is provided to compress a feed stream of a gas and thereby to form a lower pressure gas stream. A lower pressure storage bank is connected to the initial compression stage to allow the lower pressure storage bank to be charged with the lower pressure gas stream during introduction of the gas into the pressure vessel, thereby to store lower pressure gas therein. A final compression stage is selectively connected to a higher pressure storage bank to compress a stream of higher pressure gas stored in the higher pressure storage bank, thereby to produce a compressed gas stream composed of the compressed gas during the introduction of the compressed gas into the pressure vessel. Additionally, the final compression stage can be selectively connected to the lower pressure storage bank, the initial compression stage, and the higher pressure storage bank to compress a combined stream composed of the lower pressure gas stream produced by the initial compression stage and a stream of stored lower pressure gas from the lower pressure storage bank. This charges the higher pressure storage bank with the compressed gas stream during periods between the introduction of the compressed gas stream into the pressure vessel. A fill line is configured to be coupled to the pressure vessel and to be connected to the final compression stage to introduce the compressed gas stream and therefore, this compressed gas, into the pressure vessel.

A fill line is configured to be coupled to the pressure vessel and to be connected to the final compression stage to introduce the compressed gas stream and therefore, the compressed gas into the pressure vessel.

A recycle line can be connected to recycle part of the compressed gas stream in the final compression stage such that the charging of a higher pressure storage bank can be in part be effectuated by compressing a further combined stream in the final compression stage. The further combined stream can be composed of the lower pressure gas stream and part of the compressed gas stream. A remaining part of the compressed gas stream is introduced into the higher pressure storage bank. Alternatively, the final compression stage can be a variable speed compressor to allow a speed of the variable speed compressor to be reduced to in turn permit a speed of the final compression stage to be reduced. In such embodiment, the higher pressure storage bank is charged solely by compressing the lower pressure gas stream.

As stated above, the initial and final compression stages can have moving compression elements in which motion is imparted to the moving compression elements from a common source. In this regard, the initial and final compression stage can be first and second hydraulically powered reciprocating compressors. The first hydraulically powered reciprocating compressor can have first and second cylinders and the first and second cylinders can be connected in series to operate at successively higher pressures The second hydraulically powered reciprocating compressor can be provided with third and fourth cylinders connected for alternate compression. A common pump is provided to pump hydraulic fluid used in imparting motion to moving compression elements formed by pistons within the first, second, third and fourth cylinders.

This aspect of the present invention involving the common powering of compression stages, is applicable to embodiments that do not employ a lower pressure storage bank. As such, the present invention provides an apparatus for introducing a compressed gas into a pressure vessel. In accordance with this aspect of the invention, an initial compression stage is provided to compress a feed stream of a gas and thereby to form a lower pressure gas stream. A final compression stage is connected to a storage bank to compress a stream of higher compressed gas. Higher pressure gas stored in the higher pressure storage bank to produce a compressed gas stream during the introduction of the compressed gas into the pressure vessel. The initial and final compression stages can be formed by first and second hydraulically powered reciprocating compressors, respectively. A common pump can be provided to pump hydraulic fluids used to impart motion to moving compression elements formed by pistons within the first and second hydraulically powered reciprocating compressors. The storage bank in the initial compression stage can be selectively connected to the final compression stage during periods between the introduction of the compressed gas into the pressure vessel. This allows the lower pressure gas stream to be compressed within the final compression stage to produce the compressed gas stream and the compressed gas stream is then introduced into the storage bank to store the pressurized gas therewithin. The storage bank can also be selectively connected to the final compression stage during the filling of the pressure vessel to allow compression of a compressed gas stream of the compressed gas stored within the storage bank. A fill line is provided. The fill line is configured to be coupled to the pressure vessel and to be connected to the final compression stage to introduce the compressed gas stream and therefore the compressed gas into the pressure vessel. Again, the first hydraulically powered reciprocating compressor can have first and second cylinders to compress the feed stream. The first and second cylinders are connected in series to operate at successively higher pressures. The second hydraulically powered reciprocating compressor can have third and fourth cylinders to alternately compress the gas.

BRIEF DESCRIPTION OF THE DRAWING

While the specification concludes with claims distinctly pointing out the subject matter that applicants regard as their invention, it is believed that the invention would be better understood when taken in connection with the accompanying drawings in which the sole FIGURE is a schematic process flow diagram of an apparatus for carrying out a method in accordance with the present invention.

DETAILED DESCRIPTION

With reference to the sole FIGURE, an apparatus 1 is illustrated for introducing hydrogen into a vehicle fuel tank 2. It is understood, however, this is for exemplary purposes only and the present invention would have application to any compressed gas charging application.

A hydrogen feed stream entering through an inlet line 10 is provided either from storage, such as in tube trailers or is generated on-site by for instance, electrolysis. The hydrogen feed stream is typically at a pressure of between about 70 psig and about 200 psig.

Inlet line 10 is in communication with an initial compression stage 12 such that hydrogen feed stream is continually compressed within an initial compression stage 12 to form a lower pressure hydrogen stream within a line 14. Initial compression stage 12 can be a hydraulically powered reciprocating compressor also known as an intensifier having first and second cylinders 16 and 18 operating at successively higher pressures. In this regard, such intensifiers are generally capable of compressing gases at a ratio of about 8:1 per cylinder. Hydrogen feed stream is compressed in first cylinder 16 and then further compressed within second cylinder 18. Check valves 19 prevent back-flow during the compression strokes.

When hydrogen is introduced into vehicle fuel tank 2, a lower pressure storage bank, containing one or more storage tanks 20, is charged with lower pressure hydrogen stream produced in line 14 by initial compression stage 12, thereby to store lower pressure hydrogen, typically between about 850 psig and about 1500 psig. A valve 22 controlling flow to and from storage tank 20 is set in an open position for such purpose while a valve 23 controlling flow to a final compression stage 30, to be discussed, is set in a closed position. Although not shown, when multiple storage tanks are used to form the lower pressure storage bank, a flow control network would be provided to successively charge the storage tanks 20 to operating pressure.

During periods between the introduction of hydrogen into a vehicle fuel tank 2, a higher pressure storage bank, containing one or more higher pressure tanks 24 is charged with a higher pressure hydrogen stream through an outlet line 26 produced by compressing a combined stream in the final compression stage 30 that is introduced into the final compression stage by an inlet line 28 containing the valve 23.

Final compression stage 30 can be a hydraulically powered compressor having third and fourth cylinders 32 and 34 which act alternately to compress the combined stream. Check valves 35 are provided to prevent back flow during compression strokes. The combined stream is composed of the lower pressure hydrogen stream and the stream of stored lower pressure hydrogen from lower pressure storage tank 20.

In order to regulate flow during charging of the higher pressure storage bank with higher pressure hydrogen stream, valve 23 is set in an open position along with a valve 38 to allow higher pressure hydrogen stream to enter higher pressure storage tank 24. A valve 40 to control flow from higher pressure storage tank 24 is set in a closed position along with a valve 42 in a fill line 46, to be discussed. Preferably an accumulator 41 is located in a line between initial and final pressure stages 12 and 30 to stabilize the flow from pulsations that would be induced in the flow by the reciprocating type of equipment used in forming final compression stage 30. Such accumulator 41 could be an enlarged pipe section.

When hydrogen is to be dispensed into vehicle fuel tank 2, valve 23 is set in the closed position and valves 38, 40 and 42 are set in open positions. Final compression stage 30 then acts to compress a stream of higher pressure hydrogen through line 26 which is composed of the higher pressure hydrogen stored in the higher pressure hydrogen storage tank 24. Once the pressure in vehicle fuel tank 2 equalizes with higher pressure storage tank 24, valve 38 is set in the closed position. In other words, fill line 46 is initially a combination of hydrogen from the high pressure storage tank 24 and high pressure hydrogen stream 26. Once the pressure in vehicle fuel tank 2 equalizes with higher pressure storage tank 24, the compressed hydrogen within fill line 46 would consist of hydrogen solely from the stream within outlet line 26.

Higher pressure storage tank 24 stores hydrogen at pressures range from between about 850 psig and about 7000 psig. Such compression produces a compressed hydrogen stream which is introduced into a fill line 46 which can be coupled to vehicle fuel tank 2. The pressure of the compressed hydrogen can be about 6300 psig. Assuming that the compressed hydrogen heats up to a temperature of about 185° F., a settled pressure within vehicle fuel tank 2 will be about 5000 psig when full and upon cooling to an ambient temperature of about 59° F.

It is to be noted that final compression stage 30 is sized to receive flow both from initial compression stage 12 and lower pressure storage tank 20. Furthermore, initial compression stage 12 is sized to receive flow solely from inlet line 10. Thus, the entire compression machinery need not be oversized. As in the prior art, the entire machine could be oversized, but that would be more expensive than the illustrated embodiment.

Preferably when charging higher pressure storage tank 24 with the higher pressure hydrogen stream flowing through line 26, lower pressure storage tank 20 will become depleted, for instance, from about 1500 psig to about 850 psig in pressure. The objective of lower pressure storage tank 20 is to store gas, and final compressor stage 12 consumes that stored gas. Once the pressure in inlet line 28 and lower pressure storage tank 24 falls to 850 psig, recycle line 50 is used to maintain some minimum suction pressure (850 psig in this example) to final compression stage 12. In the illustrated embodiment, valve 22 is closed and first compression stage acts to introduce the lower pressure hydrogen stream and a recycle stream through a recycle line 50 into final compression stage 30. A flow control valve 52 can be provided in recycle line 50 which is controlled by a pressure sensor 54 to sense suction pressure and a pressure controller 56.

It is to be noted that an alternative to the foregoing can be providing final compression stage 30 to have a variable speed capability that can be turned down after lower pressure storage tank 20 is emptied such that final compression stage 30 does not experience a pressure drop at the suction side thereof. A hydraulic fluid flow control valve installed in line 60 is provided to adjust the speed.

In any embodiment of the present invention, the moving compression elements, for instance pistons 51 of initial compression stage 12 and pistons 55 of final compression stage 30, have motion imparted to them from a common source. This allows a method of the present invention to be conducted by equipment that is mounted on a common skid and thus avoids duplication of components and a smaller footprint of the apparatus.

In the illustrated embodiment, hydraulic fluid from a reservoir 57 is pumped by a single hydraulic delivery pump 58 through hydraulic fluid lines 60 and 62 which power a piston within motive cylinder 64 of final compression stage 30 and motive cylinder 66 of initial compression stage 12. Hydraulic fluid returns to reservoir 57 by way of hydraulic fluid return lines 68 and 70. Flow of hydraulic fluid is controlled by two, four-way valves 72 and 74 that are in turn controlled by limit switches within the cylinders of initial and final compression stages 12 and 30 to allow pistons to reverse direction. Suction pressure within inlet line 10 is monitored by pressure transmitter 76 and is controlled by a pressure controller 78 that in turn controls delivery pump 58.

In the illustration, compressed hydraulic fluid entering hydraulic fluid line 60 is introduced into motive cylinder 64 to move an actuated piston to the right. At the time the actuated piston moves to the right, hydraulic fluid previously within motive cylinder 64 that was used to impart motion to the piston to the left drains through hydraulic fluid return line 68 and flows into hydraulic fluid reservoir 57. Four-way valve 72 is set for such purpose. On a subsequent stroke, four-way valve 72 would be oppositely set so that hydraulic fluid flowing through inlet line 60 acts to move the actuated piston within motive cylinder 64 to the left and hydraulic fluid drains through hydraulic fluid line 68 to he in turn returned to hydraulic fluid reservoir 57.

With respect to initial compression stage 12, hydraulic fluid is introduced into motive cylinder 66 through hydraulic fluid line 62. This moves the actuated piston within hydraulic cylinder 66 to the right. At the same time, hydraulic fluid that previously drove the actuated piston within motive cylinder 66 to the left drains through hydraulic fluid return line 70 back to hydraulic fluid reservoir 57. Four-way valve 74 is reversed in the next stroke of initial compression stage 12 in the same manner as described with respect to final compression stage 30.

The aspect of the present invention involving commonly powering the first and second compression stages can be more widely applied and thus an embodiment of the present invention is possible in which lower pressure storage tank 20 were deleted and higher pressure storage tank 24 were filled by compressing lower pressure hydrogen stream 28 in final compression stage 30 and then dispensing hydrogen from higher pressure storage tank 24. In such case, initial compression stage 12 would be turned off and thus the hydrogen feed stream would not be used, requiring a turn down of the hydrogen generation facility.

As can be appreciated, apparatus 1 including the valves and the initial and final compression stages 12 and 30 could be manually operated or operated by an automated control system (not shown) responsive to filling requests of a user.

While the present invention has been described with reference to a preferred embodiment, as will occur to those skilled in the art, numerous changes, additions and omissions may be made without departing from the spirit and the scope of the present invention.

We claim:

1. A method of introducing a compressed gas into a pressure vessel comprising:

compressing a gas feed stream of a gas in an initial compression stage to form a lower pressure gas stream;

during the introduction of said compressed gas into said pressure vessel;

charging a lower pressure storage bank with said lower pressure gas stream, thereby to store lower pressure gas; and introducing a compressed gas stream and therefore the compressed gas into the pressure vessel, the compressed gas stream formed by compressing a stream of higher pressure gas in a final compression stage, the higher pressure gas stored in a higher pressure storage bank; and during periods between the introduction of said compressed gas into said pressure vessel, charging said higher pressure storage bank with said compressed gas stream, the compressed gas stream formed by compressing a combined gas stream in said final compression stage, the combined gas stream composed of said lower pressure gas stream and a stream of stored lower pressure gas from said lower pressure storage bank.

2. The method of claim 1, wherein said charging of said higher pressure storage bank further comprises initially compressing said combined gas stream in said final compression stage and then completing the charging of said higher pressure storage bank by compressing a further combined stream in said final compression stage, the further combined stream composed of said lower pressure gas stream and a part of said compressed gas stream, and introducing a remaining part of said compressed gas stream, into said higher pressure storage bank.

3. The method of claim 1 wherein:

said charging of said high pressure storage bank with said higher pressure gas stream further comprises initially compressing said combined gas stream in said final compression stage and then completing the charging of said higher pressure storage bank by solely compressing said lower pressure gas stream within said final compression stage;

said final compression stage is a variable speed compressor; and a speed of said variable speed compressor is reduced when said higher pressure storage bank is charged solely by compressing said lower pressure gas stream.

4. The method of claim 1, wherein said initial and final compression stages have moving compression elements and motion is imparted to said moving compression elements from a common source.

5. The method of claim 4, wherein:

said initial and final compression stages are formed by first and second hydraulically powered reciprocating compressors, respectively;

said feed stream is compressed in first and second cylinders of said first hydraulically powered reciprocating compressor, the first and second cylinders being operated at successively higher pressures;

said combined steam and said stream of higher pressure gas are each alternately compressed in third and forth cylinders of said second hydraulically powered reciprocating compressor; and hydraulic fluid pumped by a common pump is used to impart motion to moving compression elements formed by pistons within said first, second, third and forth cylinders.

6. The method of claim 1 or claim 2 or claim 3, wherein:

said pressure vessel is a vehicle fuel tank; and said gas is hydrogen.

7. The method of claim 6, wherein:

said feed stream is at a source pressure of between about 70 psig and about 200 psig;

said lower pressure storage bank is charged to a lower pressure of between about 850 psig and about 1500 psig; and said higher pressure storage bank is charged to a higher pressure of between about 850 psig and about 7000 psig.

8. A method of introducing a compressed gas into a pressure vessel comprising:

during periods between the introduction of said compressed gas into said pressure vessel;

compressing a feed stream in an initial compression stage to form a lower pressure gas stream;

compressing the lower pressure gas stream in a final compression stage to form a compressed gas stream;

charging a storage bank with said compressed gas stream to store higher pressure gas; and during the introduction of said compressed gas into said pressure vessel, introducing a compressed gas stream and therefore said compressed gas into said pressure vessel, the compressed gas stream formed by compressing a stream of the higher compressed gas in said final compression stage; and imparting motion to moving compression elements contained within said initial and final compression stages that act to compress said feed stream, said lower pressure gas stream, and said steam of the higher pressure gas from a common source.

9. The method of claim 8, wherein:

said initial and final compression stages are formed by first and second hydraulically powered reciprocating compressors, respectively;

said feed stream is compressed in first and second cylinders of said first hydraulically powered reciprocating compressor, the first and second cylinders being operated at successively higher pressures;

said lower pressure gas stream and said steam of the higher pressure gas are each alternately compressed in third and forth cylinders of said second hydraulically powered reciprocating compressor; and hydraulic fluid pumped by a common pump is used to impart the motion to the moving compression elements formed by pistons within said first, second, third and forth cylinders.

10. The method of claim 8 or claim 9, wherein: said pressure vessel is a vehicle fuel tank; and said gas is hydrogen.

11. An apparatus for introducing a compressed gas into a pressure vessel, comprising:

an initial compression stage to compress a feed stream of a gas and thereby to form a lower pressure gas stream;

a lower pressure storage bank connected to said initial compression stage to allow said lower pressure storage bank to be charged with said lower pressure gas stream during the introduction of said gas into said pressure vessel, thereby to store lower pressure gas therein;

a final compression stage selectively connected to a higher pressure storage bank to compress a stream of higher pressure gas stored in the higher pressure storage bank, thereby to produce a compressed gas stream composed of said compressed gas during the introduction of said compressed gas into said pressure vessel and selectively connected to the lower pressure storage bank, the initial compression stage, and said higher pressure storage bank to compress a combined stream composed of the lower pressure gas stream produced by the initial compression stage and a stream of stored lower pressure gas from said lower pressure storage bank, thereby to charge said higher pressure storage bank with said compressed gas stream during periods between the introduction of said compressed gas into said pressure vessel; and a fill line configured to be coupled to said pressure vessel and to be connected to said final compression stage to introduce said compressed gas stream and therefore, said compressed gas into said pressure vessel.

12. The apparatus of claim 11, further comprising a recycle line connected to recycle part of said compressed gas stream in said final compression stage such that charging of said higher pressure storage bank can in part be effectuated by compressing a further combined stream in said final compression stage, the further combined stream composed of said lower pressure gas stream and said part of said compressed gas stream and introducing a remaining part of said compressed gas stream, into said higher pressure storage bank.

13. The apparatus of claim 11 wherein said final compression stage is a variable speed compressor to allow a speed of said variable speed compressor is reduced to allow a speed of said final compression stage to be reduced and said higher pressure storage bank to be charged solely by compressing said lower pressure gas stream.

14. The apparatus of claim 11, wherein said initial and final compression stages have moving compression elements and motion is imparted to said moving compression elements from a common source.

15. The apparatus of claim 14, wherein said initial and final compression stages are first and second hydraulically powered reciprocating compressors, respectively;

said first hydraulically powered reciprocating compressor has first and second cylinders, the first and second cylinders connected in series to operate at successively higher pressures;

said second hydraulically powered reciprocating compressor has third and forth cylinders connected for alternate compression; and a common pump to pump hydraulic fluid used in imparting motion to moving compression elements formed by pistons within said first, second, third and forth cylinders.

16. An apparatus for introducing a compressed gas into a pressure vessel comprising:

an initial compression stage to compress a feed stream of a gas and thereby to form a lower pressure gas stream;

a final compression stage connected to a storage bank to compress a stream of higher compressed gas stored in the higher pressure storage bank, thereby to produce a compressed gas stream during the introduction of said compressed gas into said pressure vessel;

said initial and final compression stages formed by first and second hydraulically powered reciprocating compressors, respectively;

a common pump to pump hydraulic fluids used to impart motion to moving compression elements formed by pistons within said first and second hydraulically powered reciprocating compressors;

the storage bank and the initial compression stage being selectively connected to the final compression stage during periods between the introduction of said compressed gas into said pressure vessel such that the lower pressure gas stream is compressed within said final compression stage to produce said compressed gas stream and said compressed gas stream is introduced into said storage bank to store said pressurize gas therewithin;

the storage bank also being selectively connected to the final compression stage during the filling of said pressure vessel to allow compression of a compressed gas stream of the compressed gas stored within the storage bank; and a fill line configured to be coupled to said pressure vessel and to be connected to said final compression stage to introduce said compressed gas stream and therefore, said compressed gas into said pressure vessel.

17. The apparatus of claim 16, wherein:

said first hydraulically powered reciprocating compressor has first and second cylinders to compress the feed stream, the first and second cylinders connected in series to operate at successively higher pressures; and said second hydraulically powered reciprocating compressor has third and forth cylinders to alternately compress said gas.

* * * * *